United States Patent Office 3,071,455
Patented Jan. 1, 1963

3,071,455
POLISHING MATERIAL
Cameron G. Harman and Lothar Abraham, Cleveland, Ohio, assignors to The Univis Lens Company, Dayton, Ohio, a corporation of Ohio
No Drawing. Filed Apr. 22, 1959, Ser. No. 808,004
5 Claims. (Cl. 51—308)

This invention relates to polishing materials, particularly to the use of silicon carbide, by itself or mixed with other polishing agents, for surface polishing operations on materials, for example, such as glass, metal, ceramics, or plastics, and to a process for producing a suitable grade of silicon carbide for use in a polishing preparation.

Powdered oxide materials, for example $Fe_2O_3$, $Cr_2O_3$, $SiO_2$, $SnO_2$, and $ZrO_2$, are widely utilized as polishing agents. For the most part, these materials are relatively soft and must therefore accomplish the polishing process by smearing the surface being polished. During the movement, under pressure, of small polishing agent particles over the surface to be polished, fairly high local temperatures are created at the interface between the polishing particles and the surface. Through the combination of pressure and local increase of temperature, particles of the surface material being polished are made to flow and are transported into recesses which previously existed on the surface. During this flowing stage it is possible for contamination of the surface to occur, due to solubility of the oxide polishing materials in the glass or other melt.

Polishing by this mechanism of smearing may produce an imperfect polish, since a surface so polished is almost certain to contain some folds and waviness, unless the polishing is done relatively slowly. While certain oxide materials, such as cerium oxides and some rare earth oxides, have shown greater polishing speed than the more commonly used polishing agents, such as iron oxide rouge, these materials are expensive and therefore as a practical matter are economically unsuited for polishing operations on a mass production basis.

It has been discovered that the disadvantages of slow polishing speed and/or high polishing agent cost can be overcome through the use of silicon carbide as a polishing material. Silicon carbide of proper particle size and under certain preferred conditions of operation produces a high grade polish by what appears to be essentially a cutting action, with polish by smearing playing only a minor part.

For example, with reference to glass surfaces, silicon carbide is believed to cut glass, essentially without smearing because:

(1) Its extreme hardness makes it cut readily and permits it to retain its cutting edge longer than do softer materials;
(2) It has a high thermal conductivity which tends to minimize the magnitude of temperature rise at localized contact points;
(3) It is not soluble in glass, nor is it readily decomposed by molten glass, so that it does not cause pitting or waviness; and
(4) The residue from any decomposition or dissociation of SiC is $SiO_2$, which is good polishing material itself.

The use of silicon carbide particles for grinding, as distinguished from polishing, is widespread. The grinding action for brittle materials, such as glass, is known to be primarily that of removal of surface material fractured by the crushing action of the abrasive particles. The resulting surface appears frosted or milky. According to our new concept of the use of silicon carbide particles, much smaller particles than are suitable for grinding are employed to produce a true polish by the combined cutting and smearing action mentioned above.

Accordingly, the primary object of this invention is to provide an improved polishing preparation which contains as an essential ingredient powdered silicon carbide of suitable particle size.

Another object of this invention is to provide improved polishing preparation consisting of a polishing slurry which includes powdered silcon carbide as an essential ingredient.

A further object of the invention is to provide a polishing preparation consisting of a polishing slurry including approximately from 5% to 50% by weight of known oxide polishing powders, together with approximately 5% by weight of silicon carbide powder.

An additional object of this inventtion is to provide methods of obtaining silicon carbide powder of suitable particle size for use in preparation of a polishing slurry.

In accordance with this invention silicon carbide powder is included as an essential ingredient of a polishing preparation which may be used either as a polishing powder, as a polishing paste, or in preparation of a polishing slurry. The slurry preferably has a total solids concentration in the range of approximately twenty to fifty percent by weight, and the silicon carbide powder is provided in suitable small particle size, for example of approximately fifteen microns or less.

In the case of a polishing slurry prepared from silicon carbide powder alone, a suitable particle size may be in the one to two micron range. With such a slurry, having a solids concentration of silicon carbide of approximately from five to fifty percent (all composition percentages are given by weight), removal rates when polishing glass exceeded by an average of twenty-five percent the removal rates obtained with zirconia ($ZrO_2$) polishing suspensions. With the zirconia suspension it was observed that an increase in solids concentration beyond 20–25 percent did not result in greater polishing speed, whereas an increase in silicon carbide solids concentration resulted in a correspondingly higher removal rate.

Furthermore, optical lenses have been polished with an aqueous silicon carbide slurry prepared from powdered silicon carbide of very small particle size, ranging between one-fourth and one micron, with the average particle size being in the order of one-half micron. With such a slurry a somewhat higher quality polish has been obtained than that obtained with the silicon carbide of slightly greater particle size, i.e., between one and 15 microns.

As noted, the silicon carbide powder is an essential ingredient in the polishing powder or in the slurry, but it need not necessarily be the sole solid constituent. Suitable oxide polishing materials, for example $Fe_2O_3$, $Cr_2O_3$, $SiO_2$, $SnO_2$, or $ZrO_2$, also cerium oxides and some rare earth oxides may be used in preparation of a polishing slurry and modified by the addition of silicon carbide powder of an average particle size less than fifteen microns. As an example, in a slurry having a silicon carbide concentration of approximately one-fifth (twenty percent) of the total solids in the slurry, optical lenses polished showed a weight loss increase of fifteen to twenty percent per unit of time, as compared to polishing speed obtained from a twenty percent $ZrO_2$ slurry.

Silicon carbide of proper particle size for the polishing agent or preparation, in accordance with the invention, has been obtained by two different methods. In a preferred method, beta-silicon carbide not exceeding two microns in particle size was produced from the reaction of powdered quartz powder with powdered graphite under an argon, or other inert gas, atmosphere. A reaction temperature of 1625–1675° C. was found to give optimum results, with the reaction time being dependent on the size of the raw material charge. Generally, a small excess of flint was used and the silicon carbide produced was calcined in an oxidizing atmosphere for approximately one hour at 600° C. to remove any unreacted graphite. The preferred small-size silicon carbide fractions were obtained from the product by commonly used size separation operations.

An alternate method of obtaining silicon carbide of proper particle size consists of ball-milling commercially obtainable 600 mesh alpha-silicon carbide, and separating silicon carbide of the required size fraction from the ball-milled product by suitable means.

Accordingly, the present invention provides a novel polishing preparation which may be readily prepared and which improves the polishing operation both from the standpoint of permitting greater polishing speed without undesirable effects, and from the standpoint of providing an economical preparation which is adaptable to mass production operations.

The invention also provides suitable methods for obtaining the desired small silicon carbide particles which are used in preparation of the improved polishing slurry provided by this invention.

While the products and processes herein described constitute preferred embodiments of the invention, it is to be understood that the invention is not limited to these precise products and processes, and that changes may be made therein without departing from the scope of the invention which is defined in the appended claims.

What is claimed is:

1. A polishing preparation consisting of a polishing slurry including a powdered oxide polishing material selected from the group consisting of the oxides of iron, chromium, silicon, tin, zirconium and cerium, having a solids concentraion in the range of 5% to 50% by weight, and including as an essential ingredient silicon carbide in which substantially all particles are between ¾ and 15 microns in size.

2. As a polishing preparation for high speed polishing a slurry in which the solids consist of finely divided silicon carbide particles with an average particle size of no greater than three microns and with a solids concentration in the range of 5% to 50% by weight.

3. A polishing preparation particularly for polishing glass and like materials consisting of a powder selected from the group consisting of the powdered oxides of iron, chromium, silicon, tin, zirconium and cerium, and as an essential constituent particulate silicon carbide wherein substantially all particles of silicon carbide are less than fifteen microns in size.

4. A glass polishing preparation for high speed polishing of glass and like materials, consisting of a polishing slurry having a solids content in the range of 5% to 50% by weight, said solids including up to approximately 80% by weight of an oxide polishing material selected from the group consisting of the powdered oxides of iron, chromium, silicon, tin, zirconium and cerium, and a silicon carbide powder having a particle size substantially entirely within the range of ¾ to fifteen microns making up the remainder of said solids content.

5. A powder for use as a high speed glass polishing agent, consisting of a powdered oxide polishing material selected from the group consisting of the oxides of iron, chromium, silicon, tin, zirconium and cerium, to which has been added at least 10% by weight of silicon carbide powder having an average particle size of no greater than fifteen microns.

References Cited in the file of this patent

UNITED STATES PATENTS

| | | |
|---|---|---|
| 1,172,659 | Allen | Feb. 22, 1916 |
| 1,331,435 | Hutchins | Feb. 17, 1920 |
| 2,000,240 | Long | May 7, 1935 |
| 2,104,841 | White | Jan. 11, 1938 |
| 2,178,773 | Benner et al. | Nov. 7, 1939 |
| 2,475,565 | Houchins | July 5, 1949 |
| 2,614,946 | Proudfoot | Oct. 21, 1952 |
| 2,694,004 | Coffeen | Nov. 9, 1954 |
| 2,944,879 | Allen et al. | July 12, 1960 |
| 2,944,880 | Allen et al. | July 12, 1960 |
| 2,955,030 | Baldwin et al. | Oct. 4, 1960 |
| 2,973,246 | Harman et al. | Feb. 28, 1961 |